United States Patent Office 3,843,343
Patented Oct. 22, 1974

3,843,343
METHOD OF PRODUCING A CRYSTALLIZED GLASS BODY WITH SURFACE PATTERNS
Takeshi Okada, Hiroyuki Asada, and Shigeharu Nakamura, Otsu, Japan, assignors to Nippon Electric Glass Company, Limited, Shiga-ken, Japan
Filed Apr. 12, 1973, Ser. No. 350,336
Int. Cl. C03c 3/22, 19/00
U.S. Cl. 65—33                          4 Claims

ABSTRACT OF THE DISCLOSURE

Surface patterns are produced in a glass body which has a projecting portion by subjecting the body to a crystallizing heat treatment designed to precipitate needle-like crystals extending inwardly from the surface of the body in a direction normal to the surface. After the heat treatment, the projecting portion of the body is polished to remove said portion, leaving the surface of the body flat, and resulting in the surface pattern.

---

The present invention relates to a method of producing a crystallized glass body having a surface pattern, the body being formed from a crystallizable glass composition capable of being crystallized by a heat treatment to precipitate needle-like crystals extending inwardly from the surface of the body in a direction normal to the surface.

Various methods for producing glass bodies with desired surface patterns have been proposed, including one in which the body is formed from a crystallizable glass composition which, when heat-treated, is crystallized so as to have different hues between the surface and the interior of the body. When such a glass body is formed with a projection portion or portions on its surface and, after the heat treatment, this portion or these portions are polished or ground off to expose the interior of the body at selected locations, the surface of the body will display a pattern formed by the different hues exposed by the polishing operation.

It is a primary object of this invention to provide a method of producing a crystallized glass body with complex surface patterns.

The above and other objects are accomplished in accordance with the invention by preparing a batch of a glass composition capable of being crystallized by a heat treatment to precipitate needle-like crystals extending inwardly from the surface of the body in a direction normal to the surface, melting the batch and forming the melted glass composition into a glass body with a projecting portion. The glass body is then subjected to the heat treatment until the crystals are precipitated.

Since the crystals will extend in different directions, depending on the configuration of the projecting portion, complicated surface patterns may thus be created.

If desired, the projecting portion or portions of the crystallized glass body may be then ground down to obtain a smooth surface, and the inwardly directed needle-like crystals will then extend from the flat surface in various directions, the resultant difference in light transparency increasing the patterning effect.

The above and other objects and features of the present invention will become more apparent from the following detailed description of a simple embodiment thereof, taken in conjunction with the accompanying drawing wherein.

Figure 1:
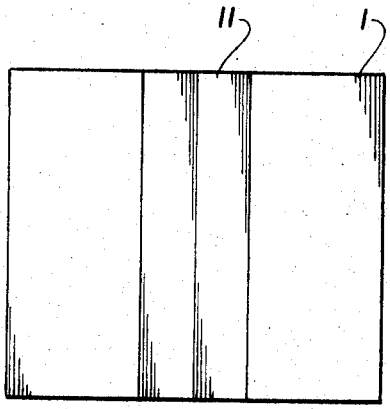
FIG. 1 is a top plan view of a glass plate with a projecting portion prepared as a blank for the practice of this invention.
Figure 3:
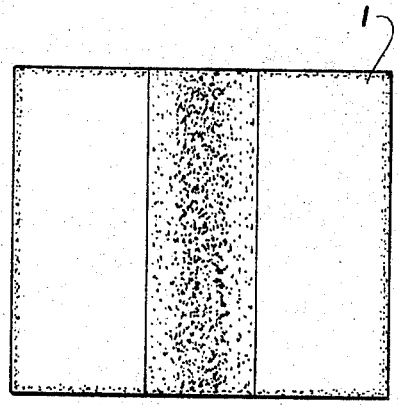
FIG. 3 shows the glass plate of FIG. 1 after crystallization.
Figure 2:
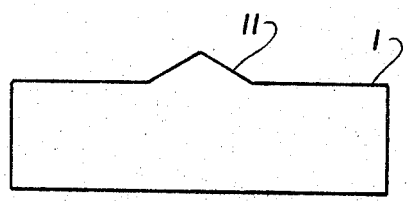
FIG. 2 is a side elevational view of the plate of FIG. 1.

By way of example, a batch consisting essentially of about 40–68% $SiO_2$, about 4–35% $Al_2O_3$ and about 15–40% $CaO$ may be prepared to form a glass composition suitable for the practice of the invention. The batch is heated to a temperature of about 1,400° to 1,550° C. and the molten glass composition is formed into glass plate 1 with a projecting ridge 11. The ridge may be formed by suitable roller means while the composition is still plastic to produce the glass body shown in FIGS. 1 and 2.

Figure 4:
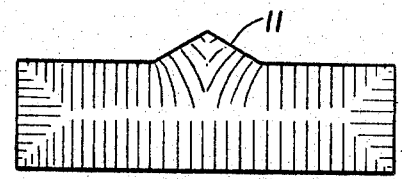
FIG. 4 shows the crystallized glass plate in a side elevational view.

When a glass body of the indicated composition is subjected to a heat treatment temperature of about 1,000° C. to 1,200° C., needle-like crystals of beta-wollastonite are precipitated to extend inwardly from the surface of the body in a direction normal to the surface, as shown in FIG. 4. As will be appreciated and is illustrated in FIG. 4, the crystal needles extending inwardly from ridge 11 take directions different from those extending from the flat portions of the glass body surface, all needles always being substantially perpendicular to the surface portion from which they extend. This produces differences in the light transparency of the body, which creates complex surface patterns further enhanced by the pattern of the projection portion.

A following Table I shows examples of specific compositions together with their melting points and heat treatment temperatures.

In Examples I and II, desired patterns have been obtained, but in Example III crystallization hardly occurred so that heat treatment was necessarily carried out over so long a time as ten hours.

TABLE I

| Example | I | II | III |
|---|---|---|---|
| $SiO_2$ | 57.5 | 63.7 | 76.0 |
| $Al_2O_3$ | 10.0 | 9.4 | 10.6 |
| $CaO$ | 32.5 | 21.2 | 9.6 |
| $Na_2O$ | | 1.9 | 1.9 |
| $K_2O$ | | 1.9 | |
| $B_2O$ | | 1.9 | 1.9 |
| Total | 100.0 | 100.0 | 100.0 |
| Melting temperature, °C | 1,400 | 1,550 | 1,550 |
| Heat treatment temperature, °C | 1,200 | 1,150 | 1,200 |
| Time, hrs | 1 | 5 | 10 |

Figure 5:
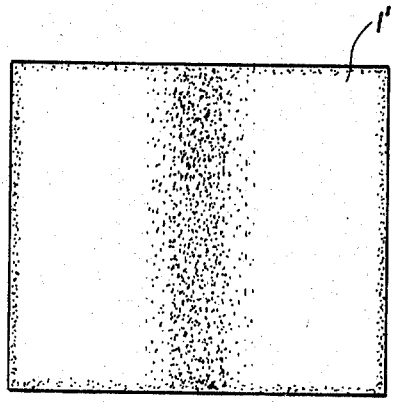
FIG. 5 illustrate the crystallized plate of FIG. 3 after the projecting portion has been ground off.
Figure 6:
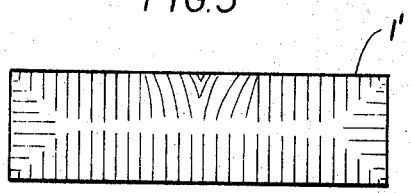
FIG. 6, is a side elevational view of the crystallized glass plate of FIG. 5.

As shown in FIGS. 5 and 6, it is also possible to grind off the projection 11 to form a smooth and flat surface 1' on the body. In this case, the directions in which the crystal needles extend in the area of the polished projecting portion still differ from those of the other crystals, leaving a complex surface pattern in the polished surface.

While the invention has been described and illustrated in connection with a specific glass composition and a simple surface projection, it will be understood that those skilled in the art may select any type of crystallizable glass composition having the indicated property and a variety of projecting portions of different numbers and shapes may be formed in the surface to increase the complexity of the surface patterns. The glass may be of any desirable color or hue.

We claim:
1. A method of producing a crystallized glass body having a surface pattern, comprising the steps of:
 (A) forming a glass body with a projecting portion from a surface of the glass body, said glass body having a composition capable of being crystallized by heat treatment to precipitate needle-like β-wol- lastonite crystals extending inwardly from the surface of the body in a direction normal to the surface, and (B) subjecting the glass body to heat treatment sufficient to precipitate needle-like β-wollastonite crystals, said precipitated needle-like crystals in the projection and the needle-like crystals in the other region of the surface of the body being different in precipitated direction; and (C) polishing the projecting portion to the surface of the body whereby a surface pattern results in the glass body.

2. The method of Claim 1 wherein the glass composition consists essentially of about 40–68% $SiO_2$, about 4–35% $Al_2O_3$ and about 15–40% CaO.

3. The method of Claim 2 wherein the glass body is heat treated at a temperature of about 1,400° C. to 1,550° C. prior to shaping the heated composition to form the projecting portion, and cooling the formed glass body to a temperature in the range of about 1,000° C. to 1,200° C. to effectuate the heat treatment.

4. The method of Claim 1, the surface pattern has needle-like crystals precipitated in the projection area partially maintained in the glass body in a direction different from that of the surface of the glass body.

References Cited
UNITED STATES PATENTS

| | | | |
|---|---|---|---|
| 3,464,807 | 9/1969 | Pressau | 65—33 |
| 3,531,303 | 9/1970 | Babat | 65—33 X |
| 3,423,217 | 1/1969 | Blaha | 65—33 X |
| 3,113,009 | 12/1963 | Brown et al. | 65—33 |
| 3,432,917 | 3/1969 | Someren | 65—61 X |
| 3,486,808 | 12/1969 | Hamblen | 65—33 X |
| 2,622,178 | 12/1952 | Glynn | 65—61 X |
| 2,314,804 | 3/1943 | Willson | 65—32 X |
| 3,511,681 | 5/1970 | Huey | 65—33 X |

S. LEON BASHORE, Primary Examiner

K. M. SCHOR, Assistant Examiner

U.S. Cl. X.R.

65—61